(12) United States Patent
Solheim et al.

(10) Patent No.: US 8,526,812 B2
(45) Date of Patent: *Sep. 3, 2013

(54) WAVELENGTH ASSIGNMENT IN AN OPTICAL WDM NETWORK

(75) Inventors: Alan Glen Solheim, Stittsville (CA); Peter David Roorda, Ottawa (CA); Kevan Peter Jones, Kanata (CA); Greg Peter Friesen, Ottawa (CA)

(73) Assignee: Alcatel Lucent, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/491,839

(22) Filed: Jun. 8, 2012

(65) Prior Publication Data

US 2012/0251103 A1    Oct. 4, 2012

Related U.S. Application Data (60) Division of application No. 13/044,833, filed on Mar. 10, 2011, now Pat. No. 8,265,481, which is a division of application No. 12/750,284, filed on Mar. 30, 2010, now Pat. No. 7,929,861, which is a division of application No. 10/017,833, filed on Dec. 12, 2001, now Pat. No. 7,715,721, which is a continuation-in-part of application No. 09/909,265, filed on Jul. 19, 2001, now Pat. No. 7,171,124.

(51) Int. Cl.
*H04B 10/08* (2006.01)

(52) U.S. Cl.
USPC .............. 398/34; 398/97; 398/79; 398/33; 398/38; 398/37; 398/25; 398/26; 398/27; 398/175; 398/177

(58) Field of Classification Search
USPC .......... 398/79, 97, 69, 33, 34, 38, 175, 177, 398/25, 26, 27, 45, 48, 49, 37, 16, 58, 55, 398/398/57, 3, 4, 5, 7, 8, 174, 176, 180, 181, 398/178, 179, 158, 159
See application file for complete search history.

(56) References Cited

U.S. PATENT DOCUMENTS

| | | | | |
|---|---|---|---|---|
| 7,190,902 | B2 * | 3/2007 | Solheim et al. | 398/69 |
| 7,715,721 | B2 * | 5/2010 | Solheim et al. | 398/97 |
| 2002/0186432 | A1 * | 12/2002 | Roorda et al. | 359/128 |

OTHER PUBLICATIONS

Kim et al, "*Regenerator placement algorithms for connection establishment in all-optical networks*", IEE Proc-Commun. 148 (1), Feb. 2001.

Ramaswami et al, "Design of logical topologies for wavelength-routed optical networks", IEEE Journal of Selected Areas in Communications 14 (5), Jun. 1996.

(Continued)

*Primary Examiner* — Hanh Phan
(74) *Attorney, Agent, or Firm* — Capitol Patent & Trademark Law Firm, PLLC (57) ABSTRACT

The path selection and wavelength assignment to a selected path are performed by mapping the wavelength reach to the demand distribution (agile reach) resulting in a 50-60% increase in the network reach. The network reach is further increased (about 2.2 times) when on-line measured performance data are used for path selection and wavelength assignment. The connections may be engineered/upgraded individually, by optimizing the parameters of the entire path or of a regenerator section of the respective path. The upgrades include changing the wavelength, adjusting the parameters of the regenerator section, controlling the launch powers, mapping a certain transmitter and/or receiver to the respective wavelength, selecting the wavelengths on a certain link so as to reduce cross-talk, increasing wavelength spacing, etc.

3 Claims, 6 Drawing Sheets

(56) References Cited

OTHER PUBLICATIONS

Zhang et al, "A heuristic wavelength assignment algorithm for multihop WDM networks with wavelength routing and wavelength re-use", IEEE/ACM Transactions on Networking 3 (3), Jun. 1995.

Mokhtar et al, "Adaptive Techniques for Routing and Wavelength Assignment in all-optical WANs", IEEE 1997.

Jukan et al, "Service-specific resource allocation in WDM networks with quality constraints", IEEE Journal of Selected Areas in Communications 18 (10), Oct. 2000.

* cited by examiner

WAVELENGTH ASSIGNMENT IN AN OPTICAL WDM NETWORK

RELATED PATENT APPLICATIONS

This application is a divisional of application Ser. No. 13/044,833 entitled "Wavelength Assignment In An Optical WDM Network" filed on Mar. 10, 2011 now U.S. Pat. No. 8,265,481, which is a divisional of application Ser. No. 12/750,284 entitled "Wavelength Assignment In An Optical WDM Network" filed on Mar. 30, 2010 now U.S. Pat. No. 7,929,861, which is a divisional of application Ser. No. 10/017,833 entitled "Wavelength Assignment In An Optical WDM Network" filed on Dec. 12, 2001 now U.S. Pat. No. 7,715,721 which is a continuation-in-part of application Ser. No. 09/909,265 entitled "Wavelength Routing and Switching Mechanism for a Photonic Network" filed on Jul. 19, 2001 U.S. Pat. No. 7,171,124 wherein the disclosures of U.S. patent application Ser. Nos. 13/044,833, 12/750,284, 10/017, 833 and 09/909,265 are hereby incorporated by reference in their entireties herein as if they had been set forth in full herein.

FIELD OF THE INVENTION

The invention resides in the field of optical WDM networks, and is directed in particular to optimizing wavelength assignment for an end-to-end path in such networks.

BACKGROUND OF THE INVENTION

Expansion of optical transport networks can be obtained by increasing the network capacity and/or reach. A higher network capacity is achieved by increasing the channel rate (time division multiplexing TDM) and increasing the density of channels in the respective transmission window, known as WDM (wavelength division multiplexing) and/or dense WDM (DWDM). The system reach, i.e. the distance between a transmitter and the next receiver, can be extended by optimizing the parameters of the transmission path.

However, optimizing the parameters of a transmission path is not a simple task. Optical signals suffer degradation along an optical path from such factors as loss, noise, inter-symbol interference, fiber dispersion, non-linearity of the elements and transmission medium, ambient temperature variations, etc.

A well-known solution to condition an optical signal is to use optical-electrical-optical (OEO) regenerators. Regeneration is the process of amplifying (correcting loss), reshaping (correcting noise and dispersion), retiming (synchronizing with the network clock), and retransmitting an optical signal. The regenerator design is channel-specific as the regeneration is performed in electrical format, so that the cost of the network increases dramatically as the channel density grows.

Emergence of optical amplifiers, which amplify all channels in the WDM signal by a certain gain in optical format (without OEO conversion), was essential in developing the D/WDM systems, as an optical amplifier may replace a number of regenerators, importantly reducing the cost of the network. Unfortunately, the optical amplifiers exhibit a wavelength-dependent gain profile, noise profile, and saturation characteristics. Hence, each optical channel experiences a different gain along a transmission link. The optical amplifiers also add noise to the signal, typically in the form of amplified spontaneous emission (ASE), so that the optical signal-to-noise ratio (OSNR) decreases at each amplifier site.

Furthermore, due to the intrinsic material characteristics of the transmission medium (the fiber), the channels of a WDM signal undergo different distortions and losses along the same link/path. To add to this, the individual performance of the channel transmitters and receivers is also different, so that each channel has different initial waveform distortions, and a different detection quality.

To summarize, the transfer function of optical amplifiers, transmission medium and other active and passive optical components in the optical link/path is a function of wavelength. This wavelength dependency on path configuration and optical device specifications results in a variable performance of the co-propagating channels at the receiving terminal for equal optical launched power levels. In other words, not all wavelengths are created equal. Experiments show that the ratio between the reach of the "best" and "worst" performing wavelengths can be more than 2:1.

Current transport networks are based on a WDM physical layer, using point-to-point (pt-pt) connectivity. As network flexibility is delivered electronically, termination of the photonic layer is necessary at each intermediate switching node along a path. In this type of network, channel allocation is fixed and link performance is optimized using span equalization.

There are numerous performance optimization methods applicable to traditional networks, all based on 'equalizing' a certain transmission parameter of the WDM signal, such as OSNR (optical signal-to-noise rate), BER (bit error rate), or Q-factor. It has been shown that the OSNR at the receiver can be equalized by adjusting the input optical power for all channels. For example, U.S. Pat. No. 5,225,922 (Chraplyvy et al.), issued on Jul. 6, 1993 to AT&T Bell Laboratories, provides for measuring the output SNRs and then iteratively adjusting the input powers to achieve equal SNRs. A telemetry path between the nodes provides the measurements obtained at one node to the other. Another example is U.S. Pat. No. 6,115,157 (Barnard et al.) issued to Nortel Networks Corporation on Sep. 5, 2000, which discloses a method of equalizing the channels of a WDM link based on an error threshold level for each channel in the WDM signal, the threshold being set in accordance with the channel rate. The transmitter power is adjusted taking into account the attenuations determined for all channels, which attenuations are calculated according to the measured BER.

Lately, ULR (ultra long reach) networks attempt to extend the distance traveled by the WDM channels in optical format for reducing the regeneration costs. To this end, ULR networks use a variety of techniques such as hybrid Raman-EDFA amplification, dispersion management, gain tilt control, etc. These techniques combined with other proprietary reach-increasing methods, have resulted in ULR networks where channels may travel over 3,000 km without regeneration.

However, current engineering methods based on span equalization present numerous inherent disadvantages.

1. Electrical switch based flexibility-limits the reach of an optical channel to the distance between two consecutive switching nodes. Thus, channels that can travel farther are truncated by the geography of the network. Since the distance between most nodes is in practice under 1,000 km, only links that are over 1,000 km (i.e. approximately less than 20-30% of all links) can benefit of any reach optimization technique. On the other hand, the majority of connections (end-to-end signal paths) exceed the nodal spacing of 1,000 km. Truncation of 70% of the connections at the switching nodes significantly reduces the benefits of the ULR techniques.

2. Traditional point-to-point WDM networks perform span and link engineering based on the "worst case" rules. Thus, in addition to the reach truncation described at 1), performance of channels that can travel farther is further lowered to the performance of the weakest channel/s. This is clearly not the most advantageous way of using the network resources.

3. Point-to-point networks are deployed based on engineering estimates and component specified limits, rather than on measured data, which in many occasions significantly under/over approximate the real span/link performance capabilities. When over-estimated, a span/link must be re-engineered after an unsuccessful set-up attempt. When under-estimated, the equipment is used inefficiently.

4. To make-up for an eventual over-estimation, current estimates are complemented with a number of engineering margins that further limit the reach.

5. As a typical optical network is characterized by a different loss in each span depending upon the fiber type, fiber length, cabling and slicing losses, span equalization becomes a span-specific, complex operation. In addition, different network operators have distinctive losses and loss distribution requirements in their networks. All this results in a plurality of hardware variants for each section of a network, with the ensuing complexity in inventory management and additional costs.

There is a need to provide a WDM network with a method for reach-capacity optimization, which uses the network resources efficiently.

SUMMARY OF THE INVENTION

The present invention is applicable to an agile photonic network where each signal travels between a source node and any destination node without unnecessary OEO conversions at all intermediate nodes. Thus, the conventional pt-pt based channel boundaries are replaced by individual wavelengths (channels) going on-ramp and off-ramp at arbitrary network nodes.

Traditional span/link performance optimization methods do not apply to end-to-end connections that pass through many spans, links and nodes without OEO conversion. Furthermore, traditional span equalization methods cannot be performed in agile networks since the connections sharing a given fiber link now have substantially different noise and distortion impairments, determined by their network traversing history.

On the other hand, the agile architecture creates the opportunity to replace the existent methods of engineering connections with new methods that make a better use of the available network resources, providing significant cost reductions.

It is an object of the present invention to optimize connections in an agile photonic network for increasing the network reach, while using the network resources efficiently, with the ultimate goal of reducing the costs of communication.

It is another object of the invention to optimize the end-to-end connections in agile photonic networks by fitting the wavelength reach distribution to the demand distribution.

Still another object of the invention is to optimize connections in agile photonic networks based on measured data rather than engineering estimates.

A further object of the invention is to individually optimize one or more connections in an agile network to obtain a target reach.

Accordingly, the invention provides a method of optimizing the performance of a connection in a wavelength switched optical network, comprising: storing wavelength performance data in a wavelength performance database for all wavelengths available for transporting user signals in said network; selecting a path with one or more regenerator sections; and assigning a set of wavelengths to said path based on said wavelength performance data.

According to another aspect of the invention, a wavelength switched optical network, is provided with a method of assigning a set of wavelengths to a path with one or more regenerator sections, comprising: assigning a wavelength to a regenerator section based on the length of said regenerator section and wavelength performance data; determining a regenerator section performance parameter for each said regenerator section and a path performance parameter for said path; and attempting to establish a connection along said path whenever said path performance parameter is within a range defining a specified class of service.

The invention also provides a method of optimizing connections in a wavelength switched optical network, comprising: determining a reach-wavelength correspondence for all wavelengths available for transporting user signals in said network and storing said correspondence in a wavelength performance database; measuring a performance parameter for each wavelength available in said network and storing said measured performance parameter in a measurement database, together with link and wavelength identification information; and assigning a set of wavelengths to a path according to said correspondence and said measured performance parameter.

Still further, the invention is directed to a connection optimization system for a network and element management system of the type including a routing platform. The connection optimization system comprises: a wavelength performance database for storing wavelength performance data for each wavelength available in said network; and a performance calculator for calculating a path performance parameter based on network connectivity information and measured path performance data, wherein said routing platform establishes a connection along a path selected based on said wavelength performance data and said path performance parameter.

According to still another aspect of the invention, the method of optimizing connections in a wavelength switched optical network, comprises: connecting an optical signal analyzer to a plurality of measurement points in said network for automatically collecting on-line measured performance data; and selecting a path for a connection based on said measured performance data.

Furthermore, the method of optimizing connections in a wavelength switched optical network comprises, according to still another aspect of the invention, modifying operation of a specified wavelength for increasing the reach of said selected wavelength for a regenerator section of a path; and controlling operation of all other wavelengths passing through said specified regenerator section for maintaining the performance data of each said all other wavelengths on said paths within a respective range.

A main advantage of the agile networks is that since a regenerator is switched into a connection only if/when necessary, based on individual channel performance, important cost savings are obtained compared with traditional networks, where regeneration is performed automatically at each switching node.

Further advantages of the reach optimization techniques according to the invention are listed below, using the same identification numbers as above, for direct comparison.

1. In agile systems, reach is determined by the path length (the distance between the end nodes), rather than by the link length (the distance between two switching nodes). A channel is now truncated after a much longer distance than in the traditional systems, as it passes through one or more intermediate nodes without OEO conversion.

2. As performance of each channel is controlled independently of the performance of the other channels, the present invention allows mapping of reach capability to demand distribution. Thus, the agile network is provided with the ability to match the connection length requirement with the wavelength reach performance, resulting in an over 50% increase in the effective reach. This is clearly a less costly and more reliable solution than the "worst case" rules used by traditional span equalization methods.

3, 4. The present invention proposes using measured rather than estimated data for path selection, regenerator placement and wavelength assignment processes. In traditional networks, span engineering can be performed before system deployment at which stage measured data are not available. Since in agile systems an end-end route (path) for a connection is setup after equipment deployment, the paths can be selected using measured performance data collected for the current connectivity, configuration and network loading. Experimental evidence shows that use of measured as opposed to estimated data might increase the deployed reach more than 50%.

5. Use of tuneable components in the context of an agile architecture allows individual control of connections performance. In this way, additional optimization may be performed on each individual connection by adjusting the operational parameters of the respective path, rather than by providing specific hardware variants for each link. This results in a simplified inventory management, which further lowers the costs.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION OF THE PREFERRED EMBODIMENTS

Figures 1A, 1B:
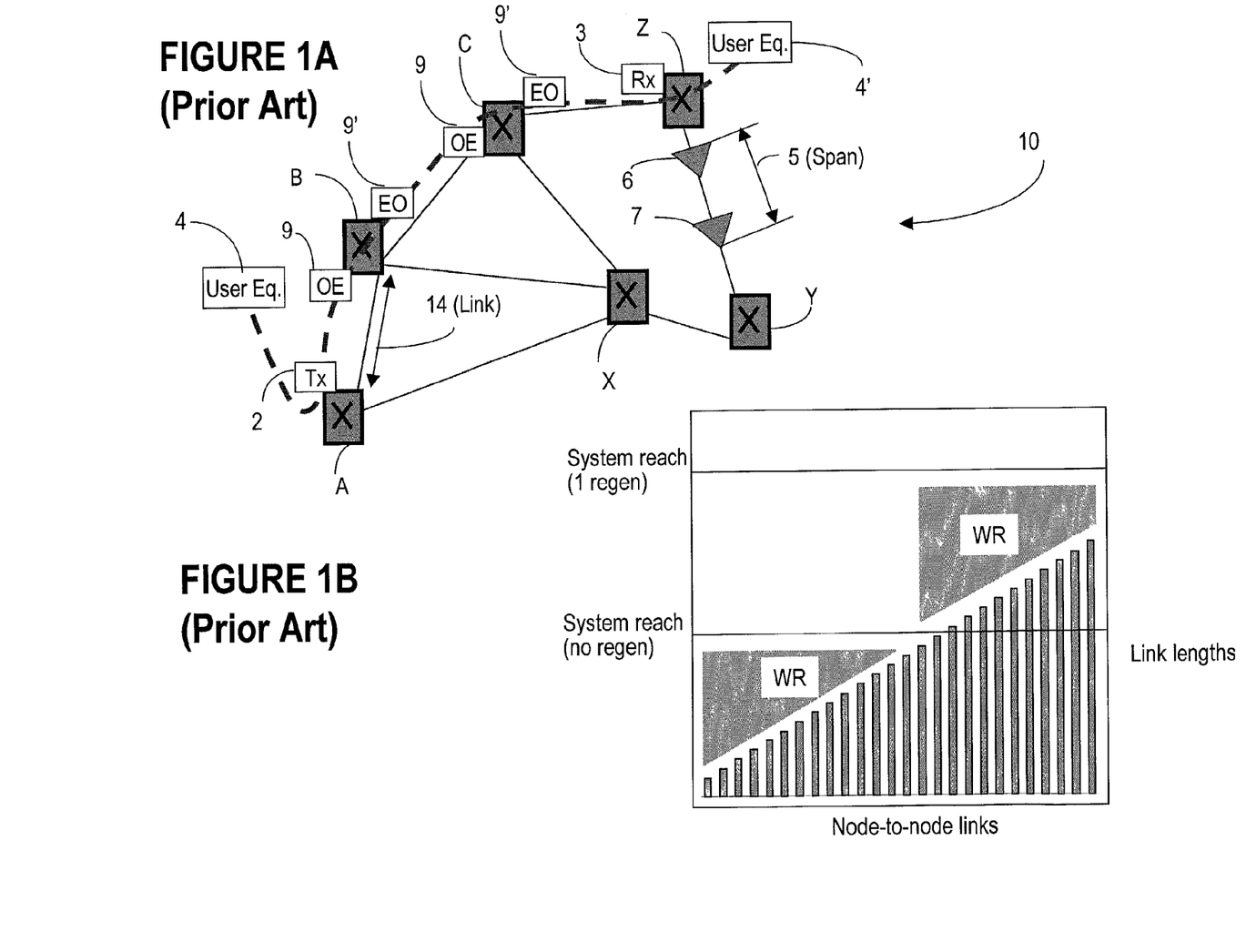
FIG. 1A shows an example of a static system.
FIG. 1B illustrates the wasted reach for the static system of FIG. 1A.

Operation of a typical network 10 is described in connection with FIGS. 1A and 1B for a better understanding of the present invention. FIG. 1A shows switching nodes A, B, C, X, Y and Z, a span (section) 5 between two optical amplifiers 6, 7 and a link 14 between two successive switching nodes A and B. FIG. 1A shown only two optical amplifiers for simplification; it is known to provide optical amplifiers on all links, in general at distances between 80-120 km.

Let's assume that a user wishes to transmit traffic over network 10 between the user equipment 4 and 4' at the respective nodes A and Z. At node A, the user signal is time division multiplexed (TDM) with other user signals and the TDM signal is converted from an electrical signal into an optical signal, as shown by block 2. This operation is performed using a transmitter, which modulates the TDM signal over an optical carrier. The channel is then wavelength division multiplexed (WDM) with other channels that travel towards node B, and is transmitted from node A to node B over optical link 14.

At node B, the signal is WDM demultiplexed, converted back to the electrical TDM signal by a dedicated receiver of OE (optical-to-electrical) block 9, and the respective user signal is switched as needed, in electrical format. At the output of node B, the user signal is EO converted, as shown by block 9', multiplexed with other optical signals, and transmitted towards node C, etc., until it reaches the destination receiver 3 at node Z. Thus, by performing OEO conversion at all intermediate nodes, all wavelengths are terminated at a distance equal to the distance between the respective two successive nodes.

Network 10 is called here a 'static system', since the wavelength allocation is static. As discussed at (1) in the Background of the Invention section, static systems 'truncate' all channels at switching nodes to perform traffic routing/switching in electronic format. Let's assume that the distance A-B is 800 km, B-C is 850 km, C-Z is 700 km so that the length of path A-B-C-Z is 2,350 km. All channels in the WDM signal traveling on link A-B are span-by-span equalized to an acceptable performance for this distance, irrespective of the individual channel reach capabilities. Let's also assume that the DWDM signal on link A-B includes a channel .lamda.33 which can carry traffic farther than 2,000 km without regeneration. However, channel .lamda.33 is truncated at node B, resulting in a wasted reach of 2,000−800=1,200 km for channel .lamda.33. The same considerations apply to systems with in-line regeneration (regenerators placed between switching nodes). If the full available spectrum is used, the reach of all wavelengths is reduced approximately in half, due to use of the "worst case" rules (see above ratio of 2:1 between the reach of the 'best' and 'worst' wavelengths).

In addition, as seen in the Background of the Invention section, span equalization is based on estimates and component specified limits (3), to which generous engineering margins are added (4). It is evident that point-to-point networks cannot take full advantage of the emerging ULR techniques. FIG. 1B shows the reach wasted denoted with WR (wasted reach) in a static, point-to-point system as shown in FIG. 1A.

Figures 2A, 2B:
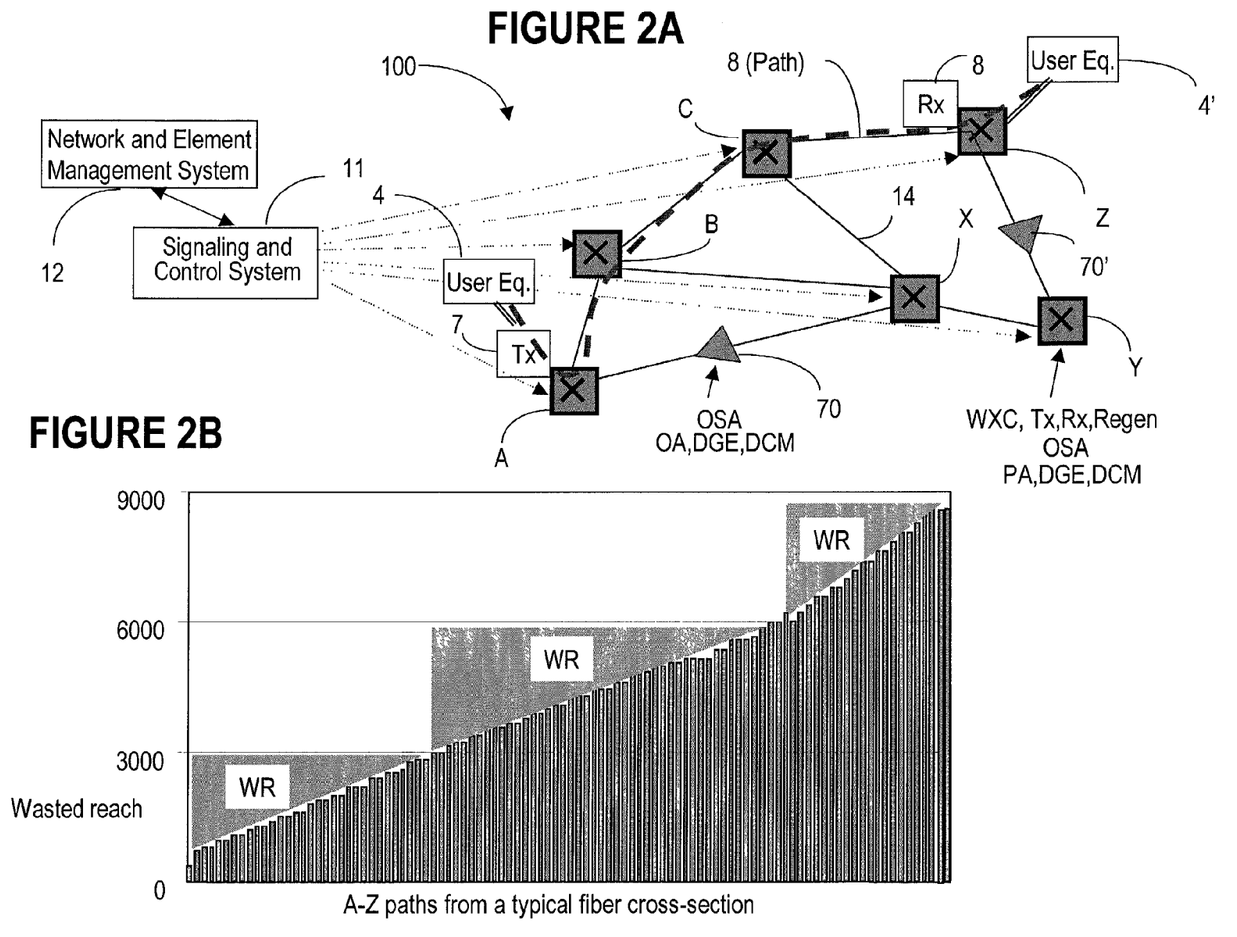
FIG. 2A shows an example of an agile system.
FIG. 2B shows the wasted reach for the agile system of FIG. 2A.

FIG. 2A shows a transparent/agile (wavelength switched) network 100 as described for example in the priority patent application. Network 100 includes a plurality of switching nodes A, B, C, Z, X, Y, which are equipped with wavelength cross-connects WXC, which can switch a channel in optical format. Each node also comprises a pool of transponders (a long-reach Rx-Tx pair and a short reach Rx-Tx pair) for local traffic ramp-on/off, and a pool of regenerators/wavelength converters (a long reach Tx-Rx pair) for regenerating and/or converting the wavelength of same channels, based on their performance and network loading.

Network 100 is provided with optical line amplification units 70, 70', for conditioning the WDM signal traveling along the respective link for ULR transmission. The line amplification units 70, 70', as well as the pre-amplifier units PA provided at the switching nodes, include optical amplifiers OAs which are preferably equipped with dynamic gain equalization means and dispersion compensation means. Dynamic gain equalizers DGEs ensure that an optimal power profile is maintained along the line. Dispersion compensation modules DCMs provide advanced fiber-based slope-matched dispersion compensation. Adjustable (tunable) DCMs can also be used in some instances. Network 100 is also equipped with multiple-port optical spectrum analyzers OSA connected throughout the network to provide visibility of signal power levels and noise levels.

FIG. 2A illustrates a connection A-Z established along a path 8 that originates at node A, passes through nodes B, C and arrives at the destination node Z in optical format.

Based on network topology information, resources availability and resources operational parameters, a network and element management system NEMS 12 monitors and controls operation of the network nodes and their connectivity, and provides node and network inventory data and various metrics. A signalling and control system SCS 11 is provided between all nodes and links of network 100 to allow topology discovery, fault monitoring, and photonic layer network management. SCS 11 also enables transferring of device specified and measured data from the respective device to various modules of the NEMS 12, and provides the devices with target operational parameters.

Note that this is an example of an agile network, the present invention applies to other agile network configurations.

If wavelength .lamda.33 is used for connection A-Z, as in FIG. 1A, the channel is truncated in network 100 after a much longer distance (2,350 km) than in the case of network 10 (800 km).

FIG. 2B shows the wasted reach for an agile system 100 where the channels co-propagating along a link are truncated by the path length. It is apparent that the regeneration cost in agile network 100 is importantly reduced, because truncation of channels is performed at much longer distances than in traditional systems 10. On the other hand, FIG. 2B shows that while wavelength utilization is much better than in FIG. 1B, further optimization of connections is possible, as the wasted reach is still significant.

As discussed above, it is possible to optimize the reach of network 100 using a plurality of techniques. Before proceeding with description of the reach optimization methods according to the invention, a brief description of a routing mechanism that can be used in network 100 is provided for clarifying some terms of interest. Details on this topic are provided in the priority patent application.

Figure 3:
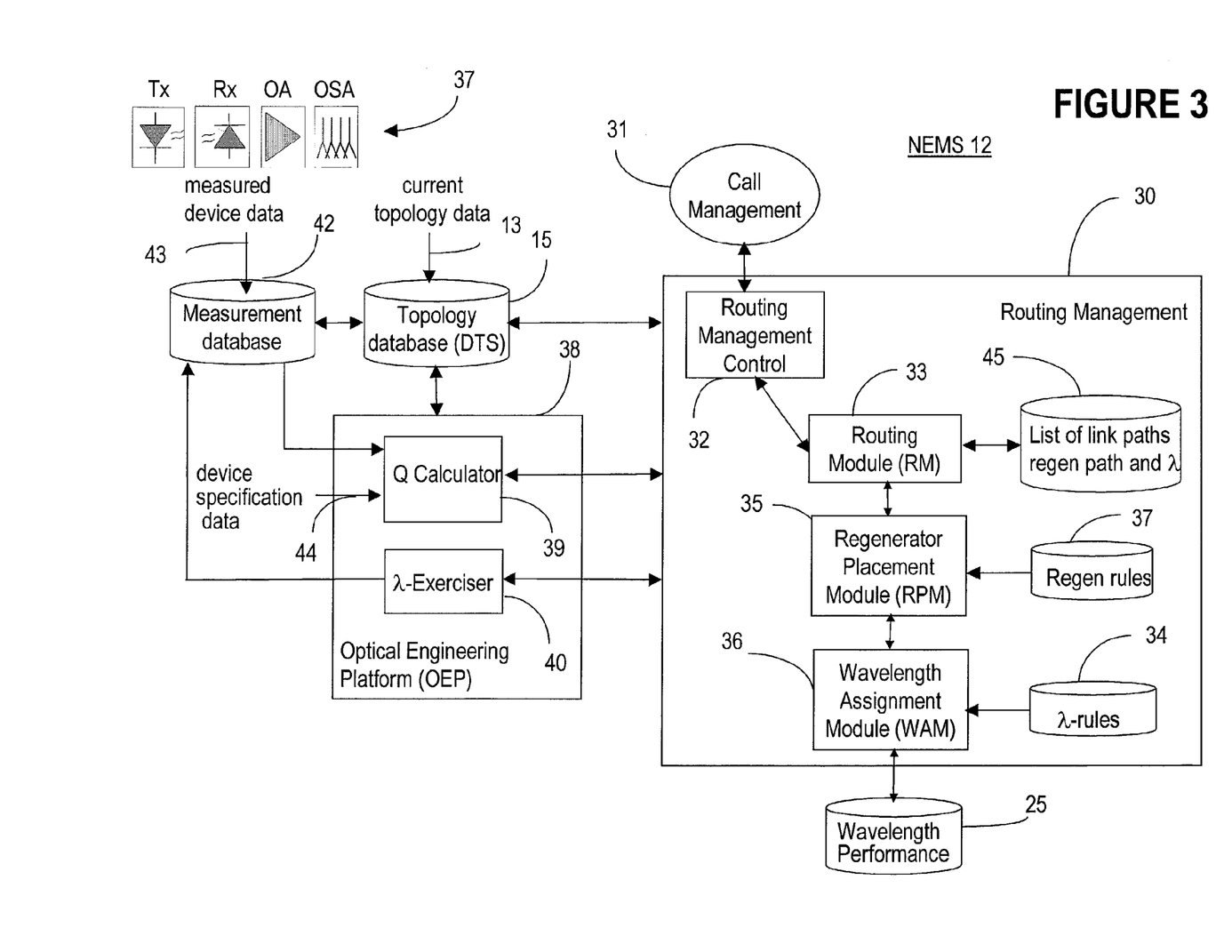
FIG. 3 shows an example of the units of a network and element management system involved in wavelength-connection mapping.

FIG. 3 illustrates a logical overview of the modules of the NEMS (network and element management system) 12 which are involved in connection optimization according to the invention. This figure also shows the interaction between these modules.

A call management block 31 provides a routing management platform 30 with a connection request. A request specifies the source node and the sink node (A and Z in the above example), defines certain conditions, and generally imposes some constraints to the connection, according to the class of services applicable to the respective user.

Routing management platform 30 comprises a routing module RM 33, a regenerator placement module RPM 35 and a wavelength assignment module WAM 36. A routing management control 32 receives the call from block 31, and operates modules RM 33, RPM 35 and WAM 36 to generate a list of possible best paths. The regenerator placement module 35 orders the path in the list according to their cost and the chance of success, and maintains this list in a database 45 until a path is successfully setup. It presents the paths from the list one by one to the call management 31, which in turn attempts to set-up a path. If the first path on the list fails, the call management 31 requests the next path from the list, and so on, until the connection is setup.

Routing module 33 is responsible with finding 'n' link paths for an A to Z connection request. RM 33 operates according to constraints received with the request from call management block 31. The link paths may be for example selected based on a cost-based link weight and a link performance parameter.

Regenerator placement module 35 is responsible for determining 'm' sets of regenerator paths for each link path. A regenerator path set comprises all regenerator paths with the same number 'k' of regenerators, each having the respective 'k' regenerators placed at a different combination of 'k' nodes. For example, a 1.sup.st set may have no regenerators, a 2.sup.nd set may have one regenerator placed at different intermediate nodes, etc. The link (fiber and equipment) between two successive regenerators is called a regenerator section. Thus, if the number of regenerators in a path is 'k', the number of regenerator sections is 'k+1'; thus, if k=0, the path has one regenerator section.

Module 35 operates based on regenerator placement constraints or rules 37. Preferably, the regenerator paths are selected based on a performance parameter (preferably the Q factor) calculated for each regenerator section. To this end, the RPM 35 invokes the WAM 36 for assigning the wavelengths to the respective regenerator sections and invokes a Q calculator 39 for calculating the Q for each link of a respective regenerator path.

Wavelength assignment module 36 assigns wavelengths to all regenerator paths. Each wavelength is selected according to wavelength rules 34, which take into account the wavelength fill sequence and the regenerator placement.

To enable full connectivity in network 100, NEMS 12 is provided with a topology database (data topology system DTS) 15 connected to all nodes of network 100 over signaling and control system SCS 11, as shown by interface 13. DTS 15 comprises updated information on network configuration and also comprises links to the specifications of the optical devices 45. The network configuration information includes, but is not limited to, network inventory information, connectivity information, information on current link loading, channel availability, etc. Device specifications (which may also include fiber specifications), also referred to as specified device data, include the operational parameters of the respective device, as provided by the manufacturer and stored at the respective device.

FIG. 3 also shows a measurement database 42 which stores performance data measured at various points in network 100 received over the signaling and control system 11, as shown by interface 43. The measured performance data includes measurements that are obtained from various devices as shown in FIG. 3. For example, the transmitter Tx can provide the effective launch power for the respective wavelength. The receiver Rx can provide eye closure and BER information. Also, dispersion of the respective regenerator section can be measured at the receiver. The optical amplifiers OA may provide span gain/loss information, reflection measurements, noise figure, power levels, etc.

Measured performance data are also collected in various points of network 100 using a plurality of optical spectrum analyzers OSA provided at switching nodes and amplifier sites. The OSAs provide visibility of signal power levels and noise levels in the respective points. Preferably, an OSA is shared by a number of modules in the network to allow minimizing the costs. OSA monitoring runs continuously, the speed being limited by the OSA technology and the OSA switch utilization (measurements using the same OSA cannot be effected simultaneously).

Database 42 is generically illustrates as a centralized entity; however some of measured performance data can be stored at the respective device and the database 42 may provide a link to the respective information. As well, the measured performance data may be stored in DTS 15.

Network 100 is provided with an optical engineering platform 38 that includes Q calculator 39. Routing Management 30 selects and orders the selected paths in database 45 based on the path performance parameter (e.g. the Q factor), which is determined by Q calculator 39. Q calculator 39 operates based upon knowledge of the network configuration extracted from topology database 15, using the specified device data and/or measured performance data.

The Q calculator is capable of extracting data for one or more channels, and calculating eye closure, nonlinear Q, WDM Q, OSNR Q and total Q. Much flexibility is offered regarding the complexity of processing, the way parameters are specified, or the type of graphical output that is generated. Once Q is below a threshold, signal regeneration is provided in the respective path, or the respective path is abandoned in favor of a new path that operates according to the user specification(s).

Figure 4:
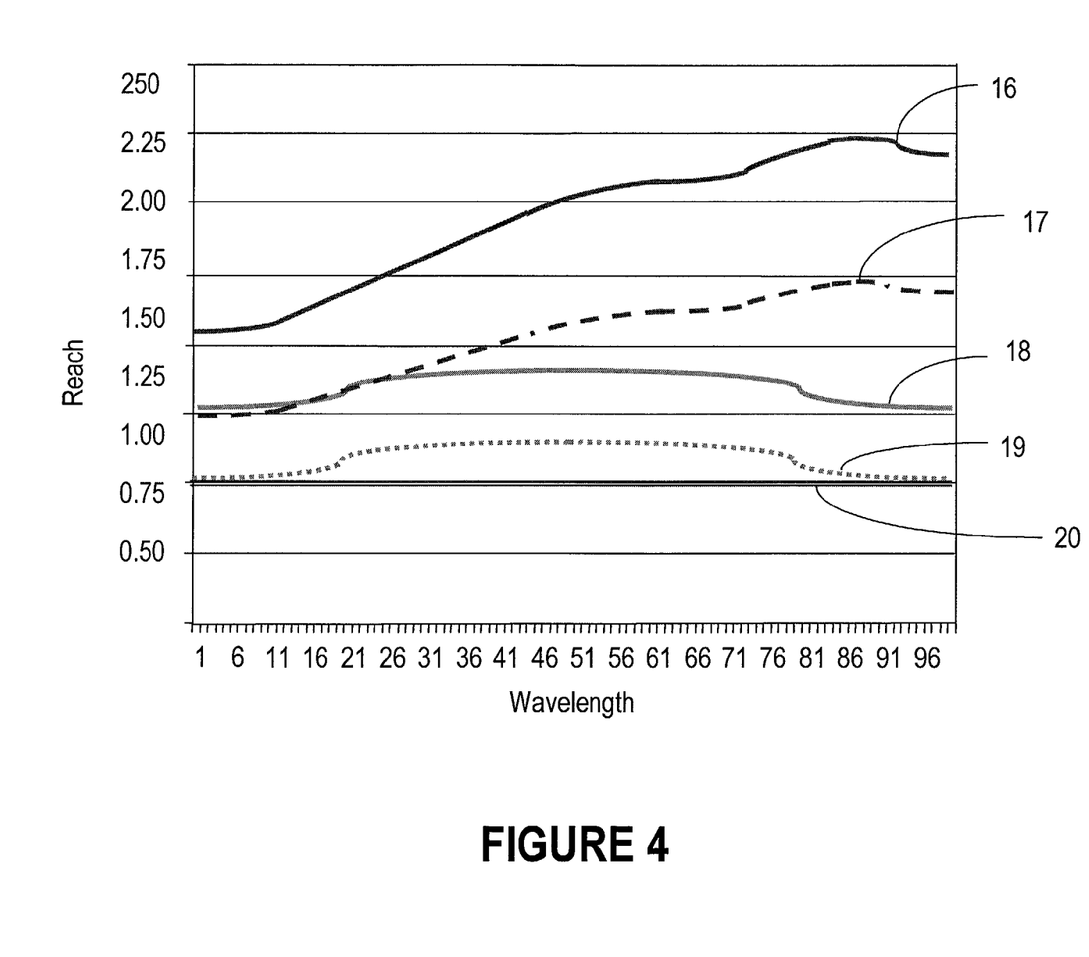
FIG. 4 is a normalized reach versus wavelength graph.

FIG. 4 shows normalized wavelength-reach graphs 16-18. Graph 16 shows the typical reach for 100 wavelengths. Graph 17 illustrates the changes in the reach of graph 16 when the penalty introduced by the component performance distribution is accounted for, i.e. the specification limits are assumed for each component.

Graph 18 illustrates the pre-emphasis to flatten the reach in current networks with a view to obtain a guaranteed reach for all channels. Graph 19 shows the performance of the wavelengths in a point-to-point deployed system, where channel performance in graph 18 is further limited by span engineering rules, overestimation of span loss (by added repair margins, use of overestimation, rounding link budget calculations). Graph 20 shows the useable performance of a traditional system limited by the worst performing channel.

It is evident that there is a large area between graphs 16 (typical reach) and 20 (deployed reach) where opportunity for agile reach improvement exists. It is also evident from this figure that if longer reach-capable wavelengths are assigned to longer regenerator sections (links), and shorter reach-capable wavelengths are assigned to shorter links, the network reach may be significantly increased.

Mapping the Wavelength Reach to the Demand Distribution (Agile Reach)

The present invention replaces the current pre-emphasis to equalize reach with a new approach, which optimizes the wavelength reach. This is called here mapping the wavelength reach to the demand distribution, or assigning wavelengths to connections, or agile reach.

To enable network 100 with agile reach, WAM 36 performs wavelength connection matching, using a wavelength performance database 25, shown on FIG. 3. Database 25 maintains information on the performance of various wavelengths. It is to be noted that database 25 can be provided as a centralized database, or can be distributed between the nodes.

The wavelength performance data can be arranged in the form of tables including at a minimum the reach of all wavelengths on a certain grid. More detailed tables could be provided, including for example link loading, fiber type information, launch power, dispersion information, etc. Note that wavelength performance data is not limited to the above example, other data may also be stored in database 25.

Instead of using tables, the wavelengths may be grouped into bins of reach, each bin corresponding to a different range of reach distances. To achieve a load-balanced wavelength fill, the wavelengths in each reach bin are further grouped into loading bins. These bins could be categorized by fiber type load and distance. For reducing the time-to-service, the most desirable bin of wavelengths from database 25 is always considered first by the routing management 30. If no wavelength from this bin is available, a bin of wavelengths with greater reach than currently required is tried, but starting at the lower end of the bin. If no wavelength bin with greater reach exists, then a wavelength bin with less reach can be used, but starting at the top end of this bin. Other strategies for selecting a wavelength while reducing the time-to-service may also be envisaged. A regenerator may be inserted in the respective path if a suitable wavelength is not available for a particular path.

As a result, network 100 has the ability to select wavelength .lamda.33 for the A-Z connection, since .lamda.33 is able to carry the client signal all the way between nodes A and Z without OEO regeneration. In the meantime, a wavelength .lamda.1, capable of a 1,000 km reach, can and will be used for e.g. a connection between nodes A and B, or B and C, or C and Z. Another wavelength, let's say .lamda.17, able to travel up to 2000 km, can be matched with a connection between nodes B and Z. If wavelength .lamda.1 were selected for connection A-Z, the user signal would have needed regeneration at both intermediate nodes B and C. If wavelength .lamda.17 were selected for connection A-Z, the user signal would have needed regeneration at one intermediate node C only.

Figure 5:
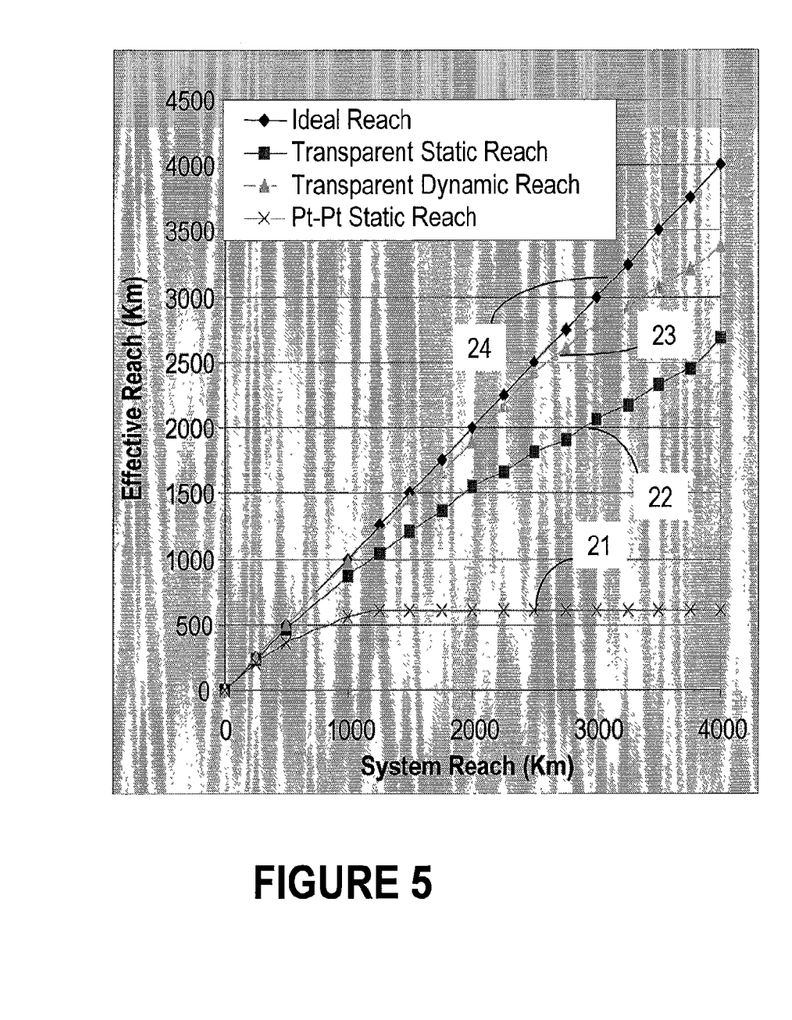
FIG. 5 shows wavelengths-reach performance graphs for networks with and without optimization.

FIG. 5 illustrates the average optical connection length across the networks (effective reach) versus the system reach, for various types of connections. Thus, this figure provides a graph 21 for a point-point system (reach truncated by the link lengths), a graph 22 for a system using end-to-end connections (reach truncated by the path lengths), a graph 23 for a system with end-to-end connection and wavelength matching (agile reach), and a graph 24 for a system with ideal wavelength-reach matching. It is clearly seen that graph 23 is closer to the ideal graph 24, especially for the larger node spacing.

It is estimated that transparent networks offer a 60% OEO savings over the point-to-point systems by enabling the effective reach to track much closer to the system reach.

Agile Reach Using Measured Performance Data

Another strategy to optimize the performance of network 100 is to use measured data for selecting a path for a connection, rather than estimated data. As discussed in the Background of the Invention section, the current networks such as network 10 are deployed based on estimates and component specified limits, which may significantly limit the real span/link performance, resulting in inefficient use of network equipment.

In addition, the estimates are currently complemented with a number of engineering margins, such as repair margins, rounded-up link budgets, that further limit the reach, as shown by graph 19 in FIG. 4.

Since the end-end route (path) for a connection is selected after equipment deployment, agile systems such as network 100 can use measured rather than estimated data for path selection, regenerator placement and wavelength assignment processes.

As explained above, wavelengths differ from each other in their optical characteristics such as dispersion, noise figure, etc. Characteristics exhibited by a particular wavelength also generally differ for different fiber types. This variability may be advantageously exploited in agile systems, which allow individual control of channels and ultimately of connections.

Figure 6:
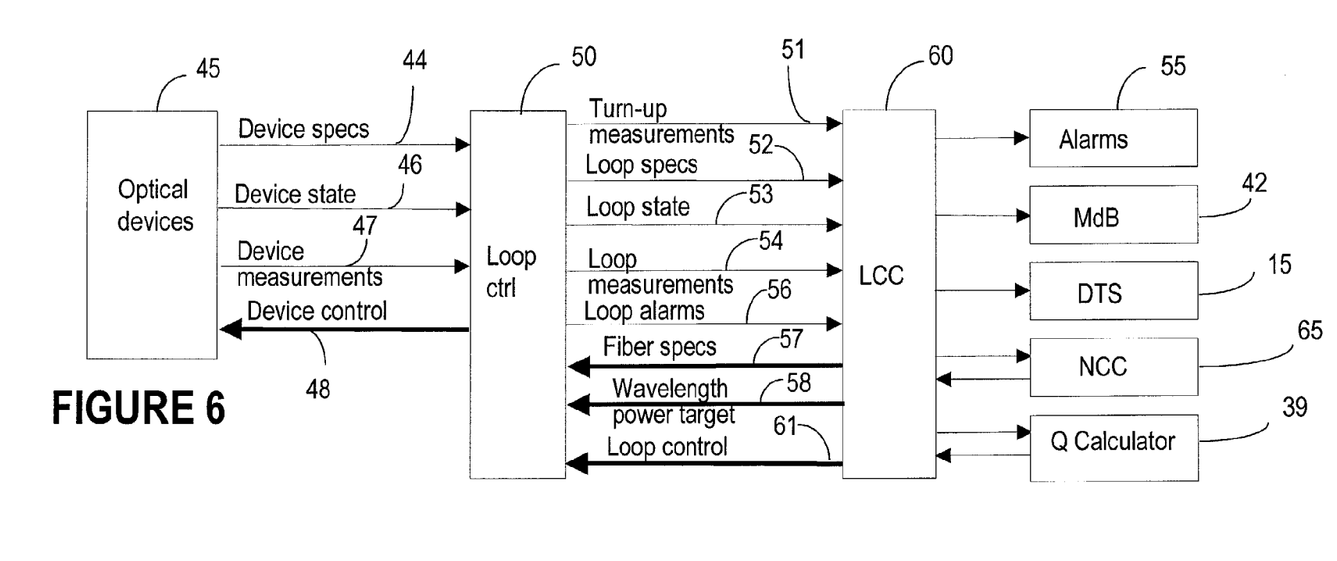
FIG. 6 illustrates the flow of information between the optical devices, the physical layer control system and the network management system.

FIG. 6 illustrates the flow of information between the optical devices 45, the physical layer control system 60 and the network management system, for illustrating how measured data is collected and used for controlling performance of individual channels. There are three levels of control shown generically in this figure, namely the loop level control, the link level control (regenerator section) and the connection (or path, or network) level control.

At the first level, a loop control 50 receives information, such as device specifications 44, device states 46, device measurements 47 from various optical devices 45 connected in the respective loop. The loop control 50 uses this information to control the device, by sending control information (loop targets) 48. An example of device specification is gain and power range for an optical amplifier. Since the optical devices 45 store their own specifications, it is possible to change the device specifications without changing the loop control 50.

At the next level, link connection controllers LCC 60 manage one or more loop controls 50. A connection controller receives loop turn-up measurements 51, loop specification information 52, loop state information 53, loop measurements 54 and loop alarms 56. A span loop for example requires fiber type and wavelength power targets, so that the respective LCC 60 sends fiber specification 57 to the respective loop control 50. Other loops may require wavelength power targets 58, dispersion targets for link commissioning, available launch power, etc.

Examples of turn-up measurements 51 are Raman gain, path loss, and module specifications including maximum DCM power. In response, the LCC 60 sends control signals such as link gain distribution, launch power range. Examples of loop state information 52 are the number of active channels, gain degradation and pump power usage. In response, the LCC 60 sends control signals such as requests to modify link gain distribution and available launch power.

At the network control level, the LCC 60 transmits alarm information shown at 55, supplies performance and monitoring data to measurement database 42, and supplies topology data to topology database 15. LCC 60 is controlled by a higher-level entity 65 of NEMS 12, and by Q calculator 39.

Examples of loop state information 52 are the number of active channels, gain degradation and pump power usage. In response, the CC 60 sends control signals such as requests to modify link gain distribution and available launch power.

As indicated in connection with FIGS. 3 and 6, database 42 maintains performance data measured by the network devices 45, which are used by Q calculator 39. Since measured performance data provide an accurate view of the current link performance, use of measured rather than estimated performance data increases significantly the chances for setting-up a connection along a selected path. This, in turn, decreases significantly the time-to-service.

In addition, a wavelength exerciser (WE) 40, shown on FIG. 3, can also be used for collecting measured performance data. The WE 40 operates at each node of network 100 at scheduled intervals to execute a plurality of tasks, such as detecting faults in the switch architecture, characterizing the link chromatic dispersion for increasing accuracy of dispersion compensation, etc. One of the tasks performed by the exerciser, and that is pertinent to this invention is to measure the wavelength performance for channels that are not used on a certain link at the time of measurement. To this end, WE 40 determines first all possible connections from each node, and also identifies all idle transponders at that node and all free wavelengths at the respective time. This information is available from the topology database 15. The call manager 31 is then invoked to set-up all these links as a background task. To reduce the amount of background processing, the WE 40 may also take into account natural wavelength capabilities for the respective link, available from wavelength performance database 25. WE 40 may drive in-service measurements of a variety of parameters, such as dispersion, gain/loss, input and output power, reflection information. Other parameters may also be measured, if necessary.

The measurements collected on the wavelength paths that are set-up by the exerciser can additionally be used to optimize parameters that require long path measurements, such as launch power into the fiber, section dispersion compensation, wavelength tolerance/tuning, per channel post compensation, etc.

WE 40 can be used in path selection and setup instead of the Q calculator 39; or these measurements obtained with the WE 40 may be used to calibrate the Q calculator. Alternatively, the Q calculator 39 can run in the background and store the Q values in measurement database 42.

Figure 7:
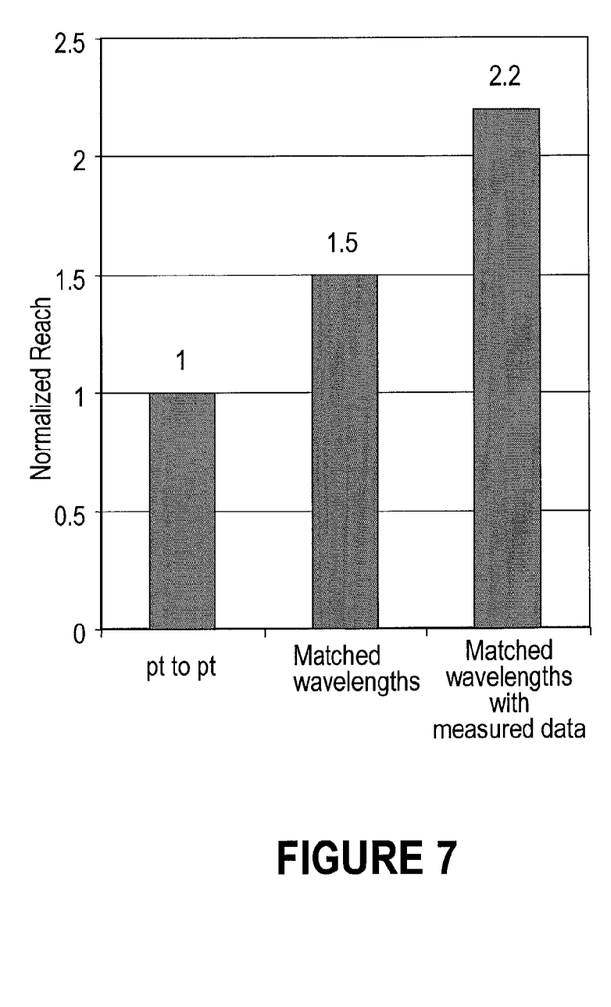
FIG. 7 shows a comparison between the normalized reach for different wavelength assignment techniques.

FIG. 7 shows a comparison between the reach obtained with a point-to-point network compared with the reach obtained with wavelength-connection matching using estimated data, and the reach obtained with wavelength-connection matching using measured data. It is apparent from FIG. 6 that while the wavelength-connection matching increases the reach by 50%, use of measured data provides a further increase in the deployed reach.

Engineering the Wavelength Reach (Engineered Reach)

The performance of a connection may further be optimized by engineering various link parameters, as described next.

1) Wavelength upgrades may be performed on request, in the case that a connection set-up fails, or an existing connection is degraded under the provisioned class of service or fails. A variety of strategies may be devised for wavelength upgrades; the intent is to find a better wavelength than the one currently used on one or more regenerator sections. Since a wavelength upgrade has a much lower cost than switching additional regenerator/s into the path, it is less expensive to first try to upgrade the wavelengths set of that path.

Figure 8:
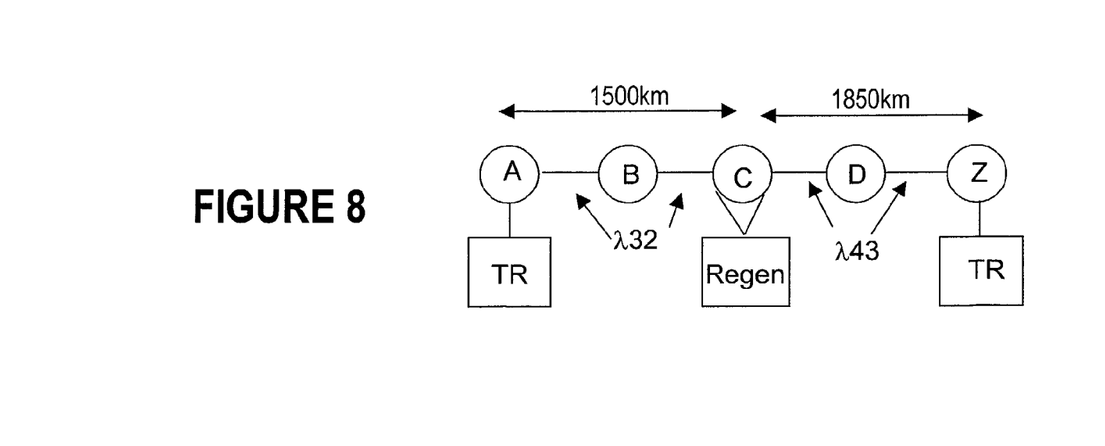
FIG. 8 illustrates upgrading wavelengths selection.

FIG. 8 illustrates the concept of wavelength upgrades for a path A-Z, which comprises in this example end nodes A and Z and intermediate nodes B, C and D, with a regenerator switched into the path at flexibility site C. In this example, the distance between nodes A and C is 1,500 km and the distance between the nodes C and Z is 1,850 km. As confirmed by the information in wavelength performance database 25, .lamda.32 and .lamda.43 are correctly suggested wavelengths for the given distances and link loading, i.e. .lamda.32 is suitable for section A-C, and .lamda.42 is suitable for section C-Z.

Let's assume that, for whatever reason, on setup or during operation, either or both wavelengths fail. Let's also assume that wavelengths .lamda.42 and .lamda.44, are available for upgrade. Chances are that the path can be setup/maintained if .lamda.32 is upgraded to .lamda.42, which belongs to the >2,000 km bin. On the other hand, no benefit can be obtained if .lamda.43 is upgraded since this belongs to the >2,000 km bin. Hence, in the example shown in FIG. 8, there is only one choice for a wavelength upgrade, which is to upgrade the section A-C. However, if .lamda.43 cannot be set-up, the only solution for establishing connectivity over segment C-Z is to switch-in a regenerator at an intermediate flexibility site D.

For paths that use more than two regenerators (k>2), a wavelength upgrade can be provided only for the weakest segment along the path (where the weakest segment is defined as the segment with the lowest Q factor) or on a segment that fails. These options could be for example provided in the wavelength rules 34.

2) It is also possible to engineer the reach of one or more specified wavelengths. Changing the performance of one or more wavelength may impact on the performance of the other wavelengths in the D/WDM signal. However, since current measured performance data are available for all wavelengths, it is possible to control wavelengths relative performance.

As in the example of FIG. 2A, the distance A-B is 800 km, B-C is 850 km, C-Z is 700 km, so that the distance between nodes A and Z is 2,350 km, and we consider channels .lamda.1 and .lamda.33. The reach of wavelength .lamda.1 can, for example, be maintained to its natural value of 1,000 km on span A-B and extended from 1,000 km to 1,600 km between nodes B and Z. Now, instead of using two regenerators for an A-Z connection using .lamda.1 (one at node B and one at node C), only one regenerator is necessary at node B, because wavelength .lamda.1 can reach node Z from node B (distance B-Z is 1550) without regeneration. Increasing reach of .lamda.1 could result in a decrease of channel .lamda.33 reach, due to the increased power of wavelength .lamda.1 on section B-Z. However, since the natural reach of this wavelength is 2,500 km, it still can carry traffic between nodes A and Z without regeneration.

The reach of wavelength .lamda.1 on B-Z section of network 100 can be increased by (a) adjusting the parameters of the path, (b) controlling the launch power, (c) mapping a certain transmitter and/or receiver to the respective wavelength, (d) selecting the wavelengths on a certain link so as to reduce cross-talk, etc.

(a) Examples of controlling the path parameters are adjusting the dynamic gain equalizers to increase the gain for certain wavelengths, flexing the Raman gain on some spans, tuning the link dispersion at the receiver side.

Co-pending US patent application "Line Amplification System for Wavelength Switched Optical Networks" (Jones et al.), filed on Oct. 11, 2001, Ser. No. 09/975,362 and now U.S. Pat. No. 6,621,621, discloses a method of manipulating the Raman gain for optimizing the performance of the optical line amplifiers based on the configuration and specification of the preceding span. Thus, the application describes changing the ratio between the powers of the Raman pumps for optimizing the OSNR.

Another way of increasing the reach of a channel is to flex the Raman gain while maintaining the EDFA gain unchanged; this improves the loss parameter of the under-performing wavelengths.

It is also possible to increase the reach of a select number of wavelengths, which can be achieved on a per channel basis using a tunable dispersion compensator for the respective channels.

(b) Another way to 'engineer' the wavelengths is to launch channels at different launch powers to favor some wavelengths at the expense of other wavelengths, again based on the wavelength performance data from database 25, current network connectivity from database 25, measured performance data from database 42, and device specifications. If we assume the network is made of constant gain elements (i.e. the optical amplifiers have a flat wavelength-gain characteristic), then the relative launch power at the transmitter dictates the relative power level through the network. Now, to set-up a new connection, the launch power is increased until the Q factor becomes good enough for the required reach, which could be less than the maximum natural reach. For the above example of FIG. 2A, the launch power for .lamda.1 at node B (the transmitter of the intermediate regenerator) can be set to a value that allows this wavelength to reach node Z. In this way, the launch power for the wavelengths with a natural shorter reach is lower than that for longer reach wavelengths.

This optimization method has the additional advantage that launching some wavelengths at a lower power, decreases the inter-channel interference on other channels (switch node cross talk, FWM, XPM). Also, as Raman gain is shared by all channels on the link, redistribution of powers at the transmit end leaves more amplifier power for the higher power channels.

Still further, the wavelengths going a longer distance, when launched at high power, will have an improved OSNR. It is to be noted that the launch power of a wavelength could be increased until optimal Q factor is obtained on the respective section; beyond this level, intra-channel non-linearities such as SPM would make further power increase to be of no benefit.

This optimization may be managed on a per link level basis and the power may be adjusted in the switch according to the requirements of each channel. This method is particularly beneficial in a network where the optical amplifiers are output power limited, and inter-channel effects are a significant penalty in the system.

(c) Mapping a transmitter to a wavelength can also increase the reach. Thus, the nodes of network 100 may be provided with a variety of transponders. Better performing transponders (such as RZ transponders) can be allocated to longer reach connections, while spectrally optimized transponders (such as e.g. 20 Gb/s transponders) may be used for connections that require less reach. Alternatively, a lower bit-rate transponder (e.g. operating at 2.5 Gb/s rather than at 10 Gb/s) may be selected for longer reach connections.

Furthermore, spectral bands of varying reach capability can be used within a system. For example, short reach C-Band transponders without dynamic gain equalization and without slope dispersion compensation, and which provide less gain, may be used for shorter connections. These could be treated as one pipe, as long as the transponders and the tunable filters in the access structure are tunable across both bands.

(d) The spacing between the wavelengths can be increased in a certain region of the spectrum. As a result, if the EDFAs are power limited (i.e. fixed total power) a higher launch power can be used for a number of wavelengths. This mode of operation also reduces the inter-channel interference. For example, a reach improvement of 50% can be obtained if the network uses at a given time a 100 GHz wavelength spacing instead of 50 GHz spacing.

To summarize, optimizing connections performance is enabled by the agile architecture of network 100, which allows independent control and monitoring of connections at link and/or regenerator section granularity. Also, the collection of updated topology, wavelength performance, device specifications and measurement data allows the network and element management system 12 to initiate adjustment of component and link parameters for specifically engineering each connection in response to users' demands.

We claim:

1. In a network and element management system including a routing platform, a connection optimization system comprising:
   a wavelength performance database for storing wavelength performance data for each wavelength available in said network;
   a performance calculator for calculating a path performance parameter based on network connectivity information and measured path performance data, wherein said routing platform establishes a connection along a path selected based on said wavelength performance data and said path performance parameter; and a wavelength exerciser for setting up test connections on all regenerator sections, for each wavelength unused on said regenerator section to populate said wavelength performance database with measured data.

2. A system as claimed in claim 1, wherein said path performance parameter includes the cost of said path and the Q factor of said path.

3. A system as claimed in claim 1 further comprising:

a measurement database for storing measured performance data for each regenerator section of said network; and an interface between said measurement database and a plurality of optical devices of said network for transmitting said measured performance data from said devices to said measurement database.

\* \* \* \* \*